US007456902B2

(12) United States Patent
Kikinis

(10) Patent No.: US 7,456,902 B2
(45) Date of Patent: Nov. 25, 2008

(54) METHOD AND SYSTEM FOR IDENTIFYING ADDRESSING DATA WITHIN A TELEVISION PRESENTATION

(75) Inventor: Dan Kikinis, Saratoga, CA (US)

(73) Assignee: JLB Ventures, LLC, Washington, DC (US)

( * ) Notice: Subject to any disclaimer, the term of this patent is extended or adjusted under 35 U.S.C. 154(b) by 20 days.

(21) Appl. No.: 10/011,856

(22) Filed: Dec. 4, 2001

(65) Prior Publication Data
US 2002/0093594 A1 Jul. 18, 2002

Related U.S. Application Data

(60) Provisional application No. 60/251,248, filed on Dec. 4, 2000.

(51) Int. Cl.
H04N 7/08 (2006.01)
H04N 7/173 (2006.01)
H04N 5/445 (2006.01)
H04N 7/00 (2006.01)

(52) U.S. Cl. .......................... 348/473; 348/468; 725/60; 725/109

(58) Field of Classification Search ................. 348/473, 348/468, 553, 554; 725/59, 60, 109–113
See application file for complete search history.

(56) References Cited

U.S. PATENT DOCUMENTS

| 5,262,860 A | 11/1993 | Fitzpatrick et al. |
| 5,414,773 A | 5/1995 | Handelman |
| 5,479,268 A | 12/1995 | Young et al. |
| 5,512,954 A * | 4/1996 | Shintani ..................... 348/468 |
| 5,532,754 A | 7/1996 | Young et al. |
| 5,543,850 A * | 8/1996 | Pratt et al. .................. 348/617 |
| 5,570,295 A | 10/1996 | Isenberg et al. .......... 379/90.01 |
| 5,633,918 A * | 5/1997 | Mankovitz ............... 379/93.24 |
| 5,671,019 A * | 9/1997 | Isoe et al. ................... 348/565 |
| 5,684,715 A * | 11/1997 | Palmer ....................... 348/473 |
| 5,694,163 A * | 12/1997 | Harrison .................... 725/110 |
| 5,708,845 A | 1/1998 | Wistendahl et al. |
| 5,724,103 A * | 3/1998 | Batchelor .................. 348/553 |
| 5,737,028 A | 4/1998 | Bertram et al. |
| 5,751,282 A | 5/1998 | Girard et al. |
| 5,774,666 A * | 6/1998 | Portuesi ..................... 725/110 |
| 5,818,441 A | 10/1998 | Throckmorton et al. |
| 5,818,935 A * | 10/1998 | Maa ........................... 380/200 |
| 5,841,563 A | 11/1998 | Effenberger |
| 5,870,084 A * | 2/1999 | Kanungo et al. ........... 345/551 |
| 5,900,915 A | 5/1999 | Morrison |
| 5,926,168 A | 7/1999 | Fan |
| 5,929,849 A * | 7/1999 | Kikinis ...................... 725/113 |
| 5,956,456 A | 9/1999 | Bang et al. |

(Continued)

FOREIGN PATENT DOCUMENTS

WO WO 00/01149 A1 1/2000

*Primary Examiner*—Victor R Kostak
(74) *Attorney, Agent, or Firm*—Banner & Witcoff, Ltd.

(57) ABSTRACT

Characters represented within a frame of a television presentation are identified. A pattern formed by a subset of the characters is identified if the pattern is indicative of an addressing datum. A provision is made for a selection of characters that form the pattern indicative of the addressing datum. In one embodiment, a web page is displayed upon a selection of characters that form a pattern indicative of an uniform resource locator for the web page.

17 Claims, 3 Drawing Sheets

U.S. PATENT DOCUMENTS

| | | | |
|---|---|---|---|
| 5,987,150 A * | 11/1999 | Coppinger | 382/100 |
| 5,999,167 A | 12/1999 | Marsh et al. | |
| 6,029,195 A | 2/2000 | Herz | |
| 6,064,438 A * | 5/2000 | Miller | 348/465 |
| 6,075,575 A | 6/2000 | Schein et al. | |
| 6,076,734 A * | 6/2000 | Dougherty et al. | 235/462.01 |
| 6,101,274 A * | 8/2000 | Pizano et al. | 382/176 |
| 6,167,188 A | 12/2000 | Young et al. | |
| 6,169,541 B1 * | 1/2001 | Smith | 715/716 |
| 6,205,485 B1 | 3/2001 | Kikinis | |
| 6,233,389 B1 | 5/2001 | Barton et al. | |
| 6,253,238 B1 | 6/2001 | Lauder et al. | |
| 6,271,831 B1 | 8/2001 | Escobosa et al. | |
| 6,285,407 B1 * | 9/2001 | Yasuki et al. | 348/554 |
| 6,308,327 B1 * | 10/2001 | Liu et al. | 725/37 |
| 6,411,725 B1 * | 6/2002 | Rhoads | 382/100 |
| 6,445,398 B1 * | 9/2002 | Gerba et al. | 715/721 |
| 6,473,804 B1 * | 10/2002 | Kaiser et al. | 709/245 |
| 6,543,052 B1 | 4/2003 | Ogasawara | 725/60 |
| 6,591,292 B1 * | 7/2003 | Morrison et al. | 709/206 |
| 6,631,523 B1 * | 10/2003 | Matthews et al. | 725/53 |
| 6,658,662 B1 * | 12/2003 | Nielsen | 725/109 |
| 6,725,260 B1 | 4/2004 | Philyaw | 709/220 |
| 6,745,234 B1 * | 6/2004 | Philyaw et al. | 709/217 |
| 6,978,053 B1 * | 12/2005 | Sarachik et al. | 382/308 |
| 2003/0093384 A1 * | 5/2003 | Durst et al. | 705/64 |

* cited by examiner

METHOD AND SYSTEM FOR IDENTIFYING ADDRESSING DATA WITHIN A TELEVISION PRESENTATION

RELATED APPLICATIONS

The present application claims priority to the provisional filed application entitled Dynamic URL OCR and automatic hyperlinking, filed on Dec. 4, 2000, Ser. No. 60/251,248, which is also incorporated herein by reference.

FIELD OF THE INVENTION

The invention relates to the field of television. More specifically, the invention relates to identifying addressing data within a television presentation.

BACKGROUND OF THE INVENTION

With the increasing popularity of the Internet as a means of conveying and receiving information, television presentations such as broadcasted programs have increasingly incorporated displaying addressing data such as uniform resource locators ("URLs"). For example, it is not uncommon for a presentation to state at its conclusion, "Please visit us at www.ourwebpage.com." In this example, "www.ourwebpage.com" is an addressing datum; an URL, to be precise. Using this URL, a viewer may direct a device capable of Internet browsing to a web page specific to the television presentation viewed. The web page may contain additional information of similar interest to what was seen in the television presentation. One who is directed to the web page may also be presented with the opportunity to send information through the Internet to those associated with the television presentation. Of course, the addressing datum need not be a web page; television presentations also sometimes display other addressing data such as email addresses, and the display of telephone numbers in television presentations is also common. Other varied forms of addressing data that allow one to contact another are also conceivable.

Television presentations are inherently limited to a span of viewing time. A television commercial, as one example of a television presentation, may only be made up of relatively few frames in which an addressing datum may be displayed. The addressing datum may in some cases be difficult to immediately commit to memory in the relatively short presentation time. Means for recording the addressing datum in a more permanent form, such as a pencil and paper or a video recorder, may not be available, or may require so much time to prepare and use that the frames of the television presentation containing the addressing datum have already vanished from view. In some circumstances, preparing such recording means may require more time and effort than a viewer desires to invest in recording or using the addressing datum. Because one television presentation typically immediately follows another, a viewer may be disinclined to interrupt his viewing experience to use a device, such as a telephone or a computer, to input the addressing datum. Thus, a viewer may be frustrated in his attempt to contact a presenter via the addressing datum, and the presenter may never even become aware that a viewer desired to contact him via the addressing datum, making the whole display of the addressing datum in the television presentation a somewhat pointless undertaking.

SUMMARY OF THE INVENTION

Characters represented within a frame of a television presentation are identified. A pattern formed by a subset of the characters is identified if the pattern is indicative of an addressing datum. A provision is made for a selection of characters that form the pattern indicative of the addressing datum. In one embodiment, a web page is displayed upon a selection of characters that form a pattern indicative of an uniform resource locator for the web page.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
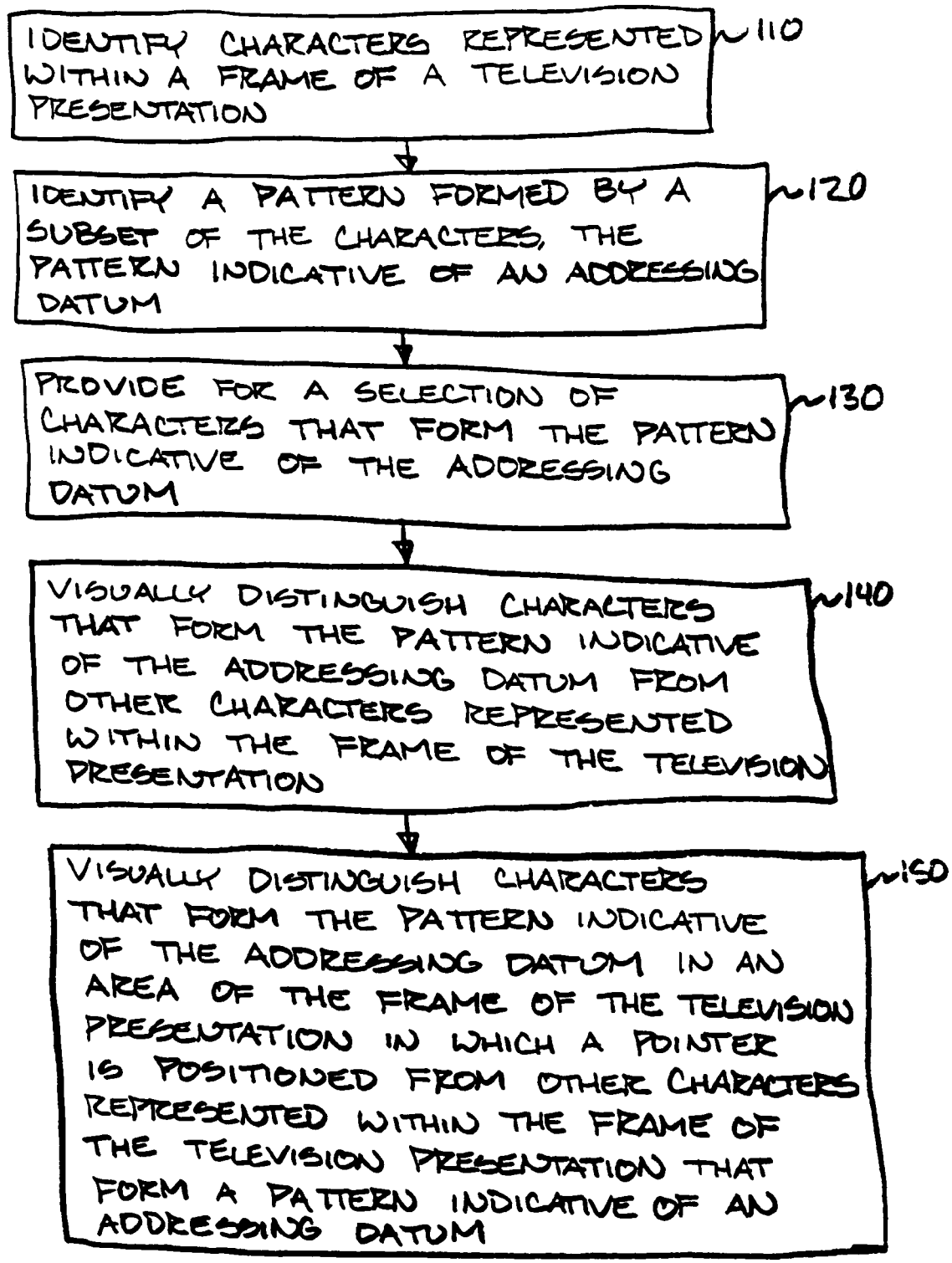
FIG. 1 illustrates a flow diagram for identifying addressing data within a television presentation, according to one embodiment.

FIG. 1 illustrates a flow diagram for identifying addressing data within a television presentation, according to one embodiment. In process block 110, characters represented within a frame of a television presentation are identified. The characters may be alphanumeric characters. The characters may be identified using optical character recognition software. The characters may be represented within one or more frames of many frames of a television presentation. Each frame contains a time slice image of the television presentation. Of course, characters could also be identified in presentations other than television presentations. Characters may be identified which are represented within frames of any multi frame visual presentation. Character identification may take place prior to or after an actual broadcasting of a television presentation. Optical character recognition software could be used to process a recorded visual presentation at any time. Character identification through optical character recognition software could be used by a producer, a broadcaster, or a viewer. In one embodiment, the process, beginning with character identification, is started when a viewer presses a button, such as a button on a remote control.

In process block 120, a pattern formed by a subset of the characters, the pattern indicative of an addressing datum, is identified. The pattern may be one of a number of predetermined recognized patterns. Each pattern may be indicative of a different kind of addressing datum. For example, the characters "www." or "http://" form patterns indicative of an uniform resource locator, one kind of addressing datum. A string of characters including an "@" symbol are indicative of an email address. Three digits enclosed in parenthesis, followed by three more digits, followed by a hyphen, followed by four digits is a pattern indicative of a telephone number, one kind of addressing datum. Of course, various other kinds of addressing data are possible, each having a different corresponding pattern.

In process block 130, a selection is provided for of the characters that form the pattern indicative of the addressing datum. The selection of the characters that form the pattern indicative of the addressing datum may be accomplished by using the controls on a television remote control. Up, down, left, and right buttons on the remote control may be used to move a visible pointer on a television screen. A button on the television remote control may be used to indicate a selection of characters in the region of the visible pointer. In one embodiment, the television presentation is paused at the current frame when a viewer initiates the character identification process, as by pushing a button. In one embodiment, rather than pausing the television presentation upon initiation of the character identification process, the viewing screen is divided into regions and the television presentation continues in one region. In one embodiment, the television presentation continues behind recognized characters.

In one embodiment, characters that form the pattern indicative of the addressing datum are visually distinguished from other characters represented within the frame of the television presentation, shown in process block 140. For example, characters may be distinguished by the overlaying of a graphic over the frame of the television presentation. The overlaying graphic may be a translucent rectangular area covering the characters to be distinguished, causing the overlayed characters to appear in a different color. Other schemes to distinguish the addressing datum are possible. The graphical overlay may cause the characters to appear to be underlined, similar to an Internet hyperlink. This identification and underlining process may be viewed as automatic hyperlinking.

Several different addressing data may be represented within a single frame of a television presentation. In such a case, each of the recognized addressing data may be visually distinguished, as described above, from other characters represented within the frame that do not indicate an addressing datum. In process block 150, according to one embodiment, characters that form the pattern indicative of the addressing datum in an area of the frame of the television presentation in which a pointer is positioned are visually distinguished from other characters represented within the frame of the television presentation that also form a pattern indicative of an addressing datum. Thus, in a frame containing more than one addressing datum, an addressing datum over which a pointer is positioned may be visually distinguished from other addressing data in the frame. In one embodiment, the selection process is ended after a predetermined time period has expired. In one embodiment, the selection process is ended upon some indication being made that no action is to be taken. Such an indication may be made through the selection of an "exit" or "no action" option represented in the frame with the addressing data. In one embodiment, the addressing datum may be edited. This editing permits a viewer to correct errors that may result during the optical character recognition process. The addressing datum may also be edited prior to actual broadcasting.

Figure 2:
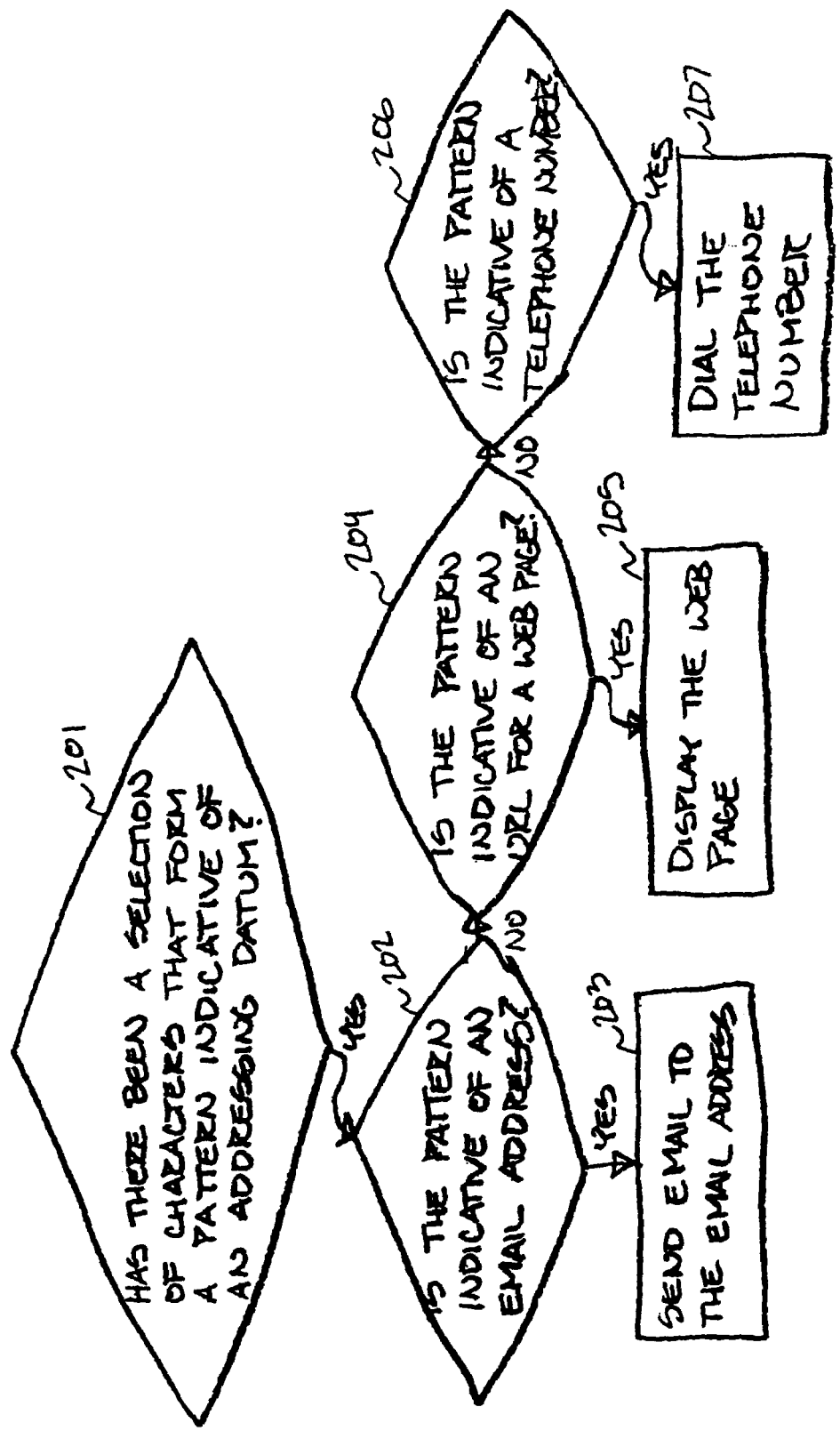
FIG. 2 illustrates a flow diagram for taking action upon a selection of an addressing datum, according to one embodiment.

FIG. 2 illustrates a flow diagram for taking action upon a selection of an addressing datum, according to one embodiment. In decision block 201, it is determined whether there has been a selection of characters that form a pattern indicative of an addressing datum. If there has been a selection of characters that form a pattern indicative of an addressing datum, then in decision block 202, it is determined whether the pattern is indicative of an email address. If it is determined that the pattern is indicative of an email address, then in process block 203, email is sent to the email address. If it is determined in decision block 202 that the pattern is not indicative of an email address, then in decision block 204, it is determined whether the pattern is indicative of an uniform resource locator for a web page. If it is determined that the pattern is indicative of an uniform resource locator for a web page, then in process block 205, the web page is displayed. If the television is not capable of displaying a web page, then in one embodiment, an Internet-ready computer may be directed to display the web page instead. If it is determined that the pattern is not indicative of an uniform resource locator for a web page, then in decision block 206, it is determined whether the pattern is indicative of a telephone number. If the pattern is indicative of a telephone number, then in process block 207, the telephone number is dialed. Of course, the pattern listed above are not exclusive. Analysis of the patterns need not be performed in any particular order.

Figure 3:
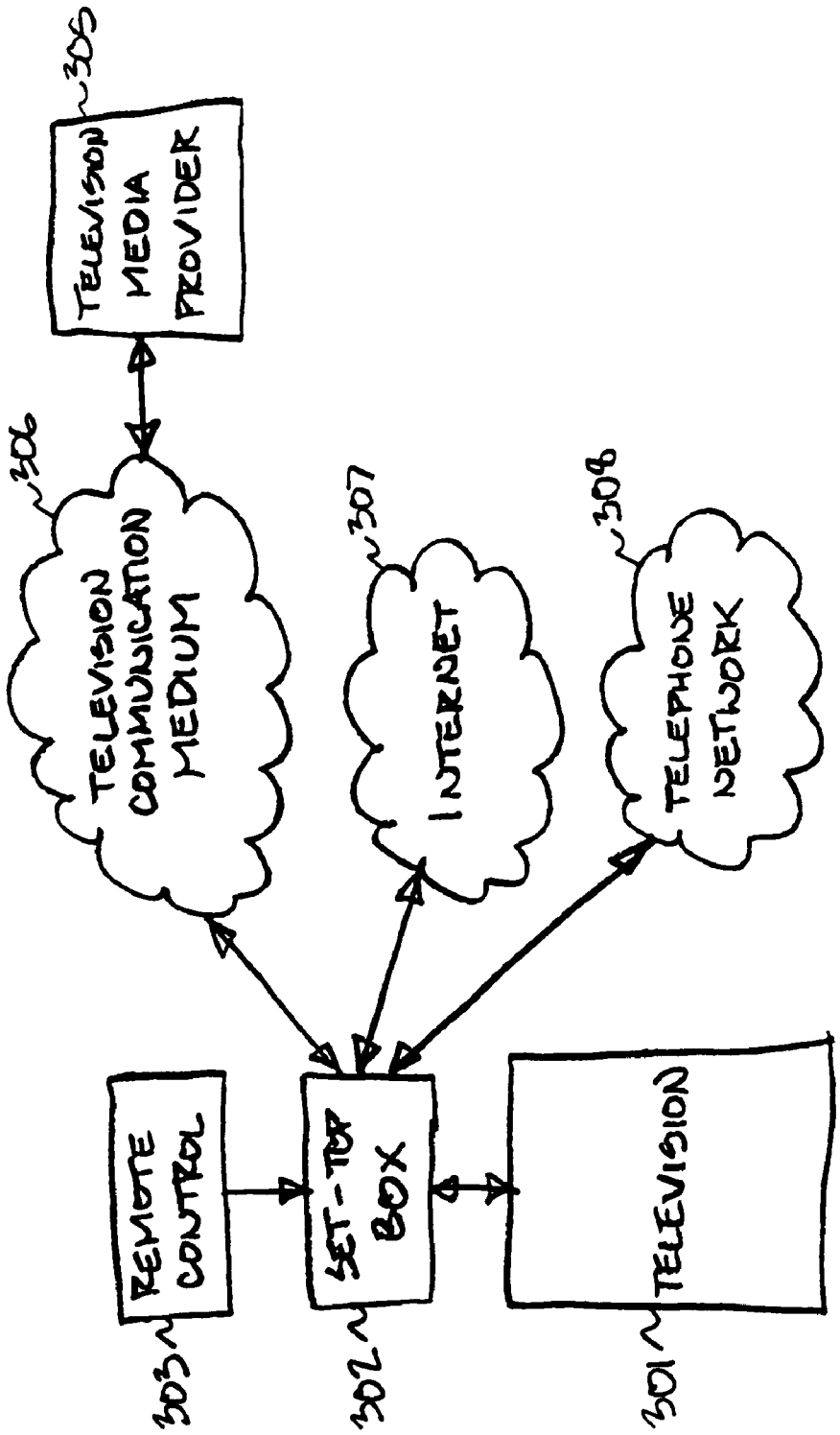
FIG. 3 illustrates a system for identifying addressing data within a television presentation, according to one embodiment.

FIG. 3 illustrates a system for identifying addressing data within a television presentation, according to one embodiment. The system includes a television 301. The television 301 is to display a television presentation. The system includes a first unit to identify characters represented within a frame of a television presentation, and to identify a pattern formed by a subset of the characters, the pattern indicative of an addressing datum. The system also includes a second unit coupled with the first unit to provide for a selection of characters that form the pattern indicative of the addressing datum. In one embodiment, the first unit and the second unit are incorporated in set-top box 302, coupled with television 301. In one embodiment, the second unit is incorporated in settop box 302, and the first unit is incorporated in television media provider 305, which communicates with set-top box 302 through television communication medium 306. In one embodiment, television media provider 305 is a computer. Television media provider 305 may have stored on it a number of files that represent television presentations. These television presentations may be broadcast to set-top box 302 through television communication medium 306. Set-top box 302, in turn, may transmit the television presentation to television 301. Television communication medium 306 may be a form of guided media, such as a cable, or it may be a form of unguided media, such as electromagnetic waves. A viewer may use remote control 303 to send commands to set-top box 302. These commands may tell set-top box 302 to select a channel or an addressing datum displayed on television 301. In one embodiment, set-top box 302 graphically overlays the addressing data presented on television 301, as described above.

In one embodiment, set-top box 302 is coupled with Internet 307. In this way, set-top box 302 may send email through the Internet and receive email from the Internet. In one embodiment, set-top box 302 is coupled with a computer that is in turn coupled with the Internet 307. In one embodiment, set-top box 302 is also coupled with a telephone network 308. In this way, set-top box 302 may dial telephone numbers represented by addressing data. In one embodiment, set-top box 302 is not present, and television 301 contains all of the functionality of set-top box 302.

In one embodiment, the first unit is also to visually distinguish the characters that form the pattern indicative of the addressing datum from other characters represented within the frame of the television presentation. In one embodiment, the second unit is also to visually to distinguish characters that form the pattern indicative of the addressing datum in an area of the frame of the television presentation in which a pointer is positioned from other characters represented within the frame of the television presentation that form a pattern indicative of an addressing datum. In one embodiment, the second unit is also to dial a telephone number upon a selection of characters that form a pattern indicative of the telephone number represented within the frame of the television presentation that form a pattern indicative of an addressing datum. In one embodiment, the second unit is also to dial a telephone number upon a selection of characters that form a pattern indicative of the telephone number. In one embodiment, the second unit is also to send an email to an email address upon a selection of characters that form a pattern indicative of the email address. In one embodiment, the second unit is also to display a web page upon a selection of characters that form a pattern indicative of an uniform resource locator for the web page.

The embodiments described above can be implemented using software in a TV viewing system. Such a TV viewing system can be implemented in many ways. A typical approach to implementation uses a set-top box that contains, among other things, a CPU, storage (e.g., RAM, ROM, etc.), a receiving network adapter, and circuitry to drive a viewing system such as a TV, monitor, projector, etc. All of these elements are not necessarily shown, but are well know in the art. For purposes of the embodiments described below, any other grouping, such as a TV with a built-in CPU, or a personal computer with TV capabilities are considered to be equivalent. Such television viewing system are typically supplied with TV content by system operators, including but not limited to cable provider/operators, satellite provider/operators, broadcasters, overbuilders, etc.

The method and apparatus disclosed herein may be integrated into advanced Internet- or network-based knowledge systems as related to information retrieval, information extraction, and question and answer systems. The system has a processor coupled to a bus. Also coupled to the bus are a memory which may contain instructions. Additional components coupled to the bus are a storage device (such as a hard drive, floppy drive, CD-ROM, DVD-ROM, etc.), an input device (such as a keyboard, mouse, light pen, bar code reader, scanner, microphone, joystick, etc.), and an output device (such as a printer, monitor, speakers, etc.). Of course, an exemplary computer system could have more components than these or a subset of the components listed.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's).

Although the present invention has been described with reference to specific exemplary embodiments, it will be evident that various modifications and changes may be made to these embodiments without departing from the broader spirit and scope of the invention. One skilled in the art will appreciate that the embodiments described above apply also to satellite and internet and telephone systems as well as cable systems. Accordingly, the specification and drawings are to be regarded in an illustrative rather than a restrictive sense.

What is claimed is:

1. A method comprising:
   identifying characters represented within a currently displayed frame of a broadcasted television presentation by a presentation system;
   identifying a pattern formed by a subset of the characters, the pattern indicative of an addressing datum by the presentation system;
   modifying an appearance of the characters that form the pattern indicative of the addressing datum to visually distinguish the characters from other characters represented within the currently displayed frame of the television presentation; and
   providing for a selection of characters that form the pattern indicative of the addressing datum by the presentation system, wherein said TV presentation is simultaneously presented without interruption by the presentation system during said identifying characters, identifying a pattern, visually distinguishing, and providing for a selection of characters.

2. The method of claim 1, wherein the step of visually distinguishing characters includes visually distinguishing characters in an area of the currently displayed frame of the television presentation in which a pointer is positioned.

3. The method of claim 1, further comprising:
   upon a selection of characters that form a pattern indicative of a telephone number, dialing the telephone number.

4. The method of claim 1, further comprising:
   upon a selection of characters that form a pattern indicative of an email address, sending email to the email address.

5. The method of claim 1, further comprising:
   upon a selection of characters that form a pattern indicative of a uniform resource locator for a web page, displaying the web page.

6. The method of claim 1 further comprising automatically determining the addressing datum to be one of a plurality of different types of addressing datum and thereafter initiating a data transmission via a communication method that is associated with the addressing datum.

7. The method of claim 1, further comprising: automatically identifying a plurality of distinct addressing datum within the frame and visually distinguishing each of the different addressing datum.

8. A computer-readable medium containing instructions that, when executed by a processor, cause the processor to perform operations comprising:
   identifying characters represented within a currently displayed frame of a broadcasted television presentation by a presentation system;
   identifying a pattern formed by a subset of the characters, the pattern indicative of an addressing datum by the presentation system;
   modifying an appearance of the characters that form the pattern indicative of the addressing datum to visually distinguish the characters from other characters represented within the currently displayed frame of the television presentation; and
   providing for a selection of characters that form the pattern indicative of the addressing datum by the presentation system, wherein said TV presentation is simultaneously presented without interruption by the presentation system during said identifying characters, identifying a pattern, visually distinguishing, and providing for a selection of characters.

9. The computer-readable medium of claim 8, wherein operations further comprise:
   the step of visually distinguishing characters that form the pattern indicative of the addressing datum is performed in an area of the currently displayed frame of the television presentation in which a pointer is positioned.

10. The computer-readable medium of claim 8, wherein operations further comprise: upon a selection of characters that form a pattern indicative of a telephone number, dialing the telephone number.

11. The computer-readable medium of claim 8, wherein operations further comprise: upon a selection of characters that form a pattern indicative of an email address, sending email to the email address.

12. The computer-readable medium of claim 8, wherein operations further comprise:
   upon a selection of characters that form a pattern indicative of a uniform resource locator for a web page, displaying the web page.

13. A system comprising:
   a first unit to identify characters represented within a currently displayed frame of a broadcasted television presentation, to identify a pattern formed by a subset of the characters, the pattern indicative of an addressing datum by a presentation system, and to modify an appearance of the pattern indicative of the addressing datum to visually distinguish the pattern from other characters represented within the currently displayed frame of the television presentation; and
   a second unit coupled with the first unit to provide for a selection of characters that form the pattern indicative of the addressing datum by the presentation system, wherein said TV presentation is simultaneously presented without interruption by the presentation system during said identifying characters, identifying a pattern, and providing for a selection of characters.

14. The system of claim 13, wherein the second unit is also to visually distinguishing characters that form the pattern indicative of the addressing datum in an area of the currently displayed frame of the television presentation in which a pointer is positioned from other characters represented within the currently displayed frame of the television presentation that form a pattern indicative of an addressing datum.

15. The system of claim 13, wherein the second unit is also to dial a telephone number upon a selection of characters that form a pattern indicative of the telephone number.

16. The system of claim 13, wherein the second unit is also to send email to an email address upon a selection of characters that form a pattern indicative of the email address.

17. The system of claim 13, wherein the second unit is also to display a web page upon a selection of characters that form a pattern indicative of a uniform resource locator for the web page.

* * * * *